US012038882B2

(12) United States Patent
Jones et al.

(10) Patent No.: US 12,038,882 B2
(45) Date of Patent: Jul. 16, 2024

(54) FILE UPLOAD ON DEMAND

(71) Applicant: Microsoft Technology Licensing, LLC, Redmond, WA (US)

(72) Inventors: Brian David Jones, Woodinville, WA (US); Kayla Lindsey Ngan, Sudbury, MA (US); Daron Spektor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/955,954

(22) Filed: Sep. 29, 2022

(65) Prior Publication Data

US 2024/0111731 A1    Apr. 4, 2024

(51) Int. Cl.
*G06F 16/00* (2019.01)
*G06F 16/11* (2019.01)
*G06F 16/16* (2019.01)
*G06F 16/178* (2019.01)

(52) U.S. Cl.
CPC .......... *G06F 16/178* (2019.01); *G06F 16/119* (2019.01); *G06F 16/162* (2019.01)

(58) Field of Classification Search
CPC ..... G06F 16/178; G06F 16/119; G06F 16/162
See application file for complete search history.

(56) References Cited

U.S. PATENT DOCUMENTS

| | | | |
|---|---|---|---|
| 9,519,654 B2* | 12/2016 | Cui | G06F 16/178 |
| 9,880,777 B1* | 1/2018 | Bono | G06F 16/178 |
| 10,558,619 B2* | 2/2020 | Rodrigues | G06F 16/1734 |
| 2005/0044530 A1* | 2/2005 | Novik | H04L 9/40 717/122 |
| 2015/0142742 A1* | 5/2015 | Hong | G06F 16/137 707/634 |
| 2015/0334182 A1* | 11/2015 | Wu | H04L 67/02 707/620 |

(Continued)

FOREIGN PATENT DOCUMENTS

| | | |
|---|---|---|
| EP | 3896578 A1 | 10/2021 |
| WO | 2016105748 A1 | 6/2016 |

OTHER PUBLICATIONS

International Search Report and Written Opinion received for PCT Application No. PCT/US2023/030986, Nov. 8, 2023, 14 pages.

*Primary Examiner* — Noosha Arjomandi
(74) *Attorney, Agent, or Firm* — NovoTechIP International PLLC

(57) ABSTRACT

A data processing system implements obtaining, at a file services platform, first mapping information by mapping files, folders, or a combination thereof stored on each of a plurality of client devices associated with a first user. The data processing system further implements synchronizing the first mapping information with the plurality of client devices, receiving a first request for a first file from a first client device of the plurality of client devices, where the first file stored locally on a second client device of the plurality of client devices. The data processing system further implements requesting that the second client device upload an instance of the first file to the file services platform; receiving the instance of the first file from the second client device; and causing the first client device to download the instance of the first file from the file services platform to the first client device.

18 Claims, 14 Drawing Sheets

(56) References Cited

U.S. PATENT DOCUMENTS

| | | |
|---|---|---|
| 2015/0370827 A1 | 12/2015 | Parkison et al. |
| 2016/0162370 A1* | 6/2016 | Mehta ................... G06F 16/162 707/610 |
| 2016/0379146 A1* | 12/2016 | Faulkner ................ H04L 67/34 705/7.13 |
| 2017/0220661 A1 | 8/2017 | Cao et al. |
| 2018/0349408 A1* | 12/2018 | Jewell ................. G06F 16/1734 |
| 2019/0188187 A1 | 6/2019 | Brand |
| 2020/0265019 A1* | 8/2020 | Murphy ................ G06F 16/162 |
| 2020/0336391 A1 | 10/2020 | Mihovilovic |
| 2022/0300459 A1* | 9/2022 | Boshev ................ G06F 16/273 |

* cited by examiner

FILE UPLOAD ON DEMAND

BACKGROUND

Numerous file storage and management platforms exist for synchronizing files and folders on a client device with a cloud-based file storage platform for storing and managing access to the files and folders. The files and folders may be synchronized across multiple computing devices, including but not limited to desktop computers, laptop computers, tablet computers, mobile phones and/or other mobile devices, and/or other types of computing devices. The file storage and management platform typically synchronizes designated namespaces or folders with the storage of the cloud-based service and the one or more client devices. The file storage and management platform synchronizes a hierarchical mapping of content items stored in the designated namespaces or folders of each client device with a file storage maintained by the file storage platform to make these files and folders accessible from the various client devices permitted to access these files or folders. Currently, the hierarchical mapping of the namespace or folders is only synchronized to the cloud service from a particular client device when the client device synchronizes both hierarchical metadata and content data for the files and folders in the namespace. However, synchronizing the hierarchical mapping information among the client devices without having to also synchronize the associated files and folders can provide several benefits. These benefits include reducing upload bandwidth requirements for uploading content to the file and storage requirements on the file storage and management platform. Hence, there is a need for improved systems and methods that provide a technical solution for synchronizing hierarchical information among client devices without automatically synchronizing the files and folders.

SUMMARY

An example data processing system according to the disclosure may include a processor and a machine-readable medium storing executable instructions. The instructions when executed cause the processor to perform operations including obtaining, at a file services platform, first mapping information by mapping files, folders, or a combination thereof stored on each of a plurality of client devices associated with a first user, the file services platform being configured to selectively synchronize instances of the files, folders, or both among the plurality of client devices; synchronizing the first mapping information with the plurality of client devices; receiving a first request for a first file from a first client device of the plurality of client devices, the first file stored locally on a second client device of the plurality of client devices; requesting that the second client device upload an instance of the first file to the file services platform; receiving the instance of the first file from the second client device; and causing the first device to download the instance of the first file from the file services platform to the first client device.

An example data processing system according to the disclosure may include a processor and a machine-readable medium storing executable instructions. The instructions when executed cause the processor to perform operations including obtaining first mapping information, at a first client device, from a file services platform for files, folders, or a combination thereof stored on a plurality of other client devices associated with a first user; presenting the first mapping information on a user interface for managing the storage and download of files among the client devices and the file services platform the first client device, including presenting information indicating on which device each file or folder is located and synchronization information indicating whether each file or folder has been synchronized with the first client device, the file services platform, and one or more of the other client devices; receiving a signal from the user interface requesting a first file from the file services platform, wherein the first file is not synchronized with the file services platform but is stored on a second client device of the plurality of client devices; and receiving, from the file services platform, an instance of the first file obtained from the second client device.

An example method implemented in a data processing system for managing synchronization of file among a plurality of client devices and a file services platform includes obtaining, at a file services platform, first mapping information by mapping files, folders, or a combination thereof stored on each of a plurality of client devices associated with a first user, the file services platform being configured to selectively synchronize instances of the files, folders, or both among the plurality of client devices; synchronizing the first mapping information with the plurality of client devices; receiving a first request for a first file from a first client device of the plurality of client devices, the first file stored locally on a second client device of the plurality of client devices; requesting that the second client device upload an instance of the first file to the file services platform; receiving the instance of the first file from the second client device; and causing the first device to download the instance of the first file from the file services platform to the first client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
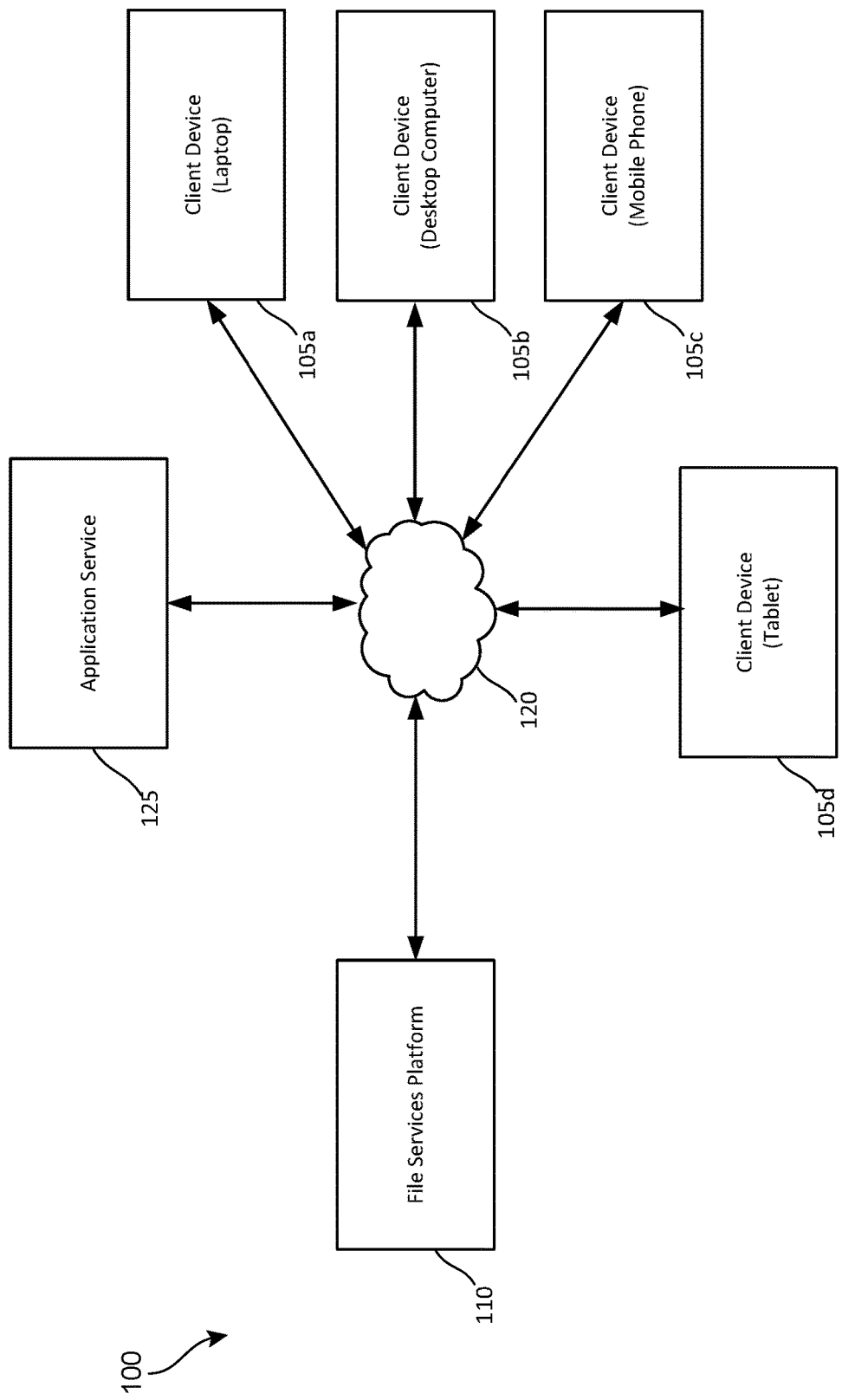
FIG. 1 is a diagram showing an example computing environment in which the techniques disclosed herein for managing the synchronization of files and file information among client devices and a file storage platform may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for managing the synchronization of files and file information among client devices and a file storage platform are provided. These techniques address the technical problems associated with synchronizing files and/or folders among client devices and a file services platform by sharing topological information and/or metadata for files and/or folders stored on one or more client devices without requiring that the files and/or folders represented by this topological information also be synchronized with the client device. A user may gain access to the files and/or folders that have been mapped for each of the client devices without the need to synchronize the files and/or folder themselves with the file storage platform and/or the each of the individual client devices. A technical benefit is that this approach reduces the computing and/or storage resources of the file storage platform and/or the client devices by permitting users to request files that are stored on another client device to not be uploaded to the file services platform until requested. This approach can reduce the upload bandwidth requirements and file storage requirements for the customer, as well as reduce the memory and computing resources of the file services platform associated with uploading content to the file services platform and storing the content on the file services platform. Furthermore, the user may selectively upload files or folders to the file storage platform from each of the client devices as these files are folders needed rather than automatically synchronizing and storing copies of these files and folders with the file storage platform. The techniques herein permit the user to configure which files and/or folders are synchronized to which client devices and/or the file storage platform. The user may also browse the mapping of files and/or folders from any authorized client device to view information indicating which files and/or folders are stored on each of the client devices and the file services platform. The user may also instruct the file storage platform to obtain and provide a copy of specified files and/or folders that are stored on another client device or the file storage platform but have not been synchronized with the client device that the user is currently using. Consequently, the user has granular control over which content is available on any specific client device and/or from the file storage platform at any time. This approach not only provides an improved user experience by providing the user with the flexibility to access their files and/or folder on any of their client devices at any time, but also provides improved security and privacy considerations. These and other technical benefits of the techniques disclosed herein will be evident from the discussion of the example implementations that follow.

FIG. 1 is a diagram showing an example computing environment 100 in which the techniques disclosed herein for managing the synchronization of files and file information among client devices and a file storage platform may be implemented. The computing environment 100 may include a file services platform 110. The example computing environment 100 may also include client devices 105*a*, 105*b*, 105*c*, and 105*d* (collectively referred to as client device 105) and application services 125. The client devices 105*a*, 105*b*, 105*c*, and 105*d* may communicate with the file services platform 110 and/or the application service 125 via the network 120. Furthermore, the application service 125 may communicate with the file services platform 110 via the network 120. The network 120 may be a combination of one or more public and/or private networks and may be implemented at least in part by the Internet.

In the example shown in FIG. 1, the file services platform 110 is implemented as a cloud-based service or set of services. The file services platform 110 is configured to store and manage the upload and download of files and folders to the client devices 105*a*-105*d*. The file services platform 110 obtains the topological information and/or metadata for file and/or folders that are stored on the client devices 105*a*-105*d* and shares the topological information and/or metadata with the client devices 105*a*-105*d* without requiring that the files and/or folders represented by this topological information also be synchronized with the client devices 105*a*-105*d*. In some implementations, the file services platform 110 provides the topological information and/or metadata to each of the client devices 105*a*-105*d*. In other implementations, the topological information and/or metadata associated with each of the client devices 105*a*-105*d* is stored on the file services platform 110 but the file services platform 110 provides means for users of the client devices 105*a*-105*d* to browse the topological information and/or metadata stored on the file services platform 110 so that the user may determine where instances of a particular file or folder are being stored. This permits a user to browse the mapping of files and folders stored on each of the client devices 105*a*-105*d* without requiring that the files and/or folders stored therein are synchronized with the file services platform 110 and/or the other client devices 105. Furthermore, the user has flexible and granular control over where copies of the files and/or folders are stored and synchronized. Demonstrating how the user may control where their files are stored and synchronized is shown in the examples which follow. In some implementations, the file services platform 110, or at least a portion of the functionality thereof, may be implemented by the application services 125 to provide file storage and/or management for users of the application services. In other implementations, the file services platform 110, or at least a portion of the functionality thereof, may be implemented by a native application on the client devices 105*a*, 105*b*, 105*c*, and 105*d*.

The application service 125 provides cloud-based software and services that are accessible to users via the client devices 105*a*, 105*b*, 105*c*, and 105*d*. The application service 125 provides one or more software applications, including but not limited to communications platform and/or collaboration platform, a word processing application, a presentation design application, and/or other types of applications in which user may create and/or access electronic documents. The electronic documents may be stored on one or more of the file services platform 110 and the client devices 105a-105d. The term "electronic document" as used herein can be representative of any document or component in electronic form that can be created by a computing device, stored in a machine-readable storage medium, and/or transferred among computing devices over a network connection or via a machine-readable storage medium. Examples of such electronic documents include but are not limited to word processing documents, presentations, websites (e.g., Microsoft SharePoint® sites), digital drawings, media files, components thereof, and the like.

The client devices 105a, 105b, 105c, and 105d are each a computing device that may be implemented as a portable electronic device, such as a mobile phone, a tablet computer, a laptop computer, a portable digital assistant device, a portable game console, and/or other such devices. The client devices 105a, 105b, and 105c may also be implemented in computing devices having other form factors, such as a desktop computer, vehicle onboard computing system, a kiosk, a point-of-sale system, a video game console, and/or other types of computing devices. While the example implementation illustrated in FIG. 2 includes four client devices, other implementations may include a different number of client devices 105 that may utilize the application service 125 and/or the file services platform 110. Furthermore, in some implementations, the application functionality provided by the application service 125 may be implemented by a native application installed on the client devices 105a, 105b, 105c, and 105d, and the client devices 105a, 105b, 105c, and 105d may communicate directly with the file services platform 110 over a network connection.

In the example implementation shown in FIG. 1, each of the client devices 105a, 105b, 105c, and 105d is associated with the same user to more clearly illustrate the techniques herein. In this example implementation, the client device 105a is a laptop computer, the client device 105b is a desktop computer, the client device 105c is a mobile phone, and the client device 105d is a tablet computer 105d. However, the user may be associated with a different number and/or different type or types of client devices in other implementations. In a typical implementation, the file services platform 110 provides file storage and management services to many users who are associated with one or more client devices 105. Furthermore, in some implementations, the file services platform 110 facilitates synchronization of files among the devices of more than one user. For example, users within an organization or enterprise, within a family, or other groups of users may permit certain files and/or folders to be shared with other specified users and to be synchronized with one or more client devices 105 of the other users.

Figure 2:
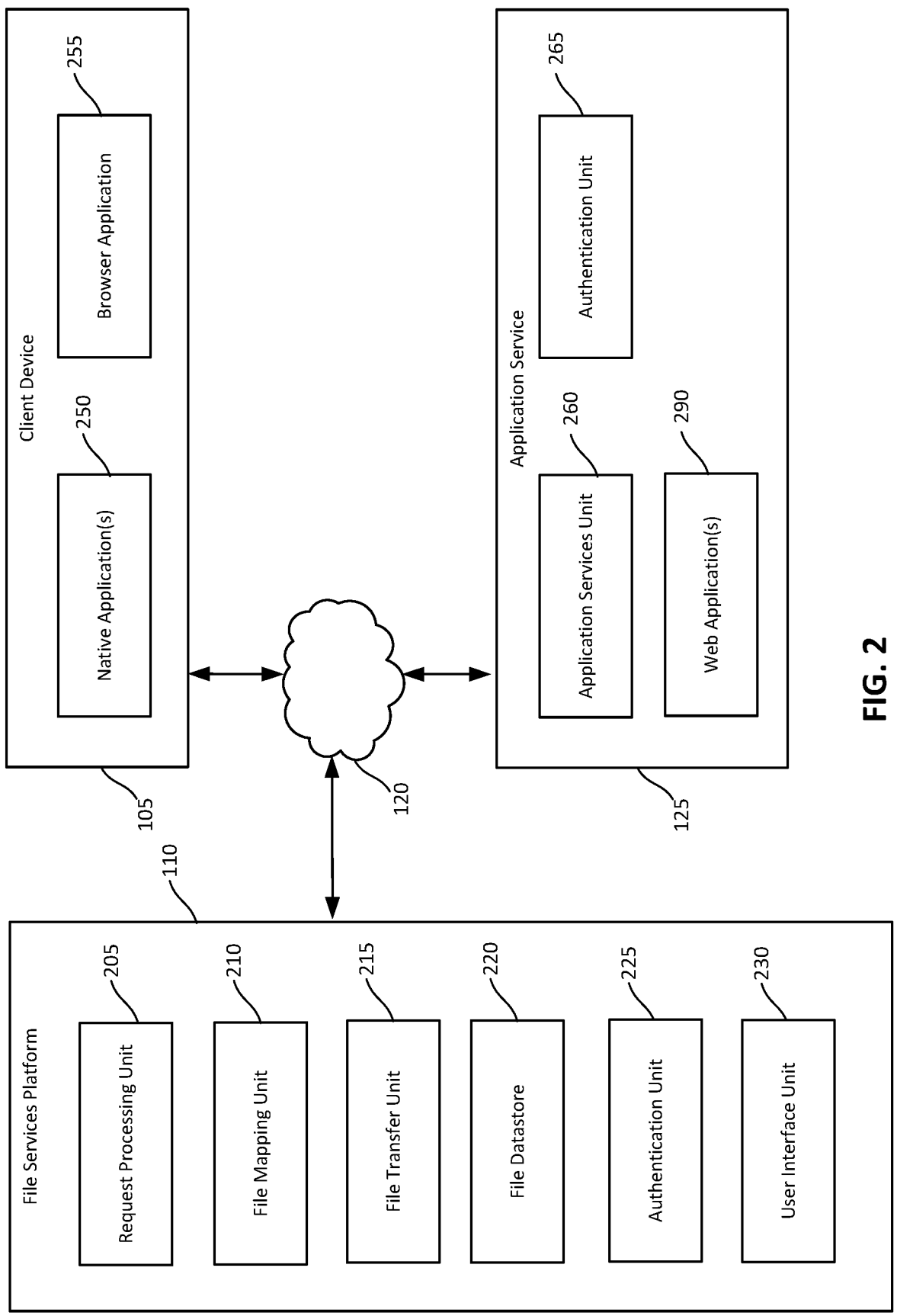
FIG. 2 is a diagram showing additional features of the file services platform, the client device, and the application service shown in FIG. 1.

FIG. 2 is a diagram showing additional features of the file services platform 110, the client device 105, and the application service 125. The file services platform 110 includes a request processing unit 205, a file mapping unit 210, a file transfer unit 215, a file datastore 220, an authentication unit 225, and a user interface unit 230.

The request processing unit 205 receives requests from a client device 105 or the application service 125 to upload or download one or more files or folders. An upload request indicates that the one or more files or folders are to be uploaded and stored in the file datastore 220 of the file services platform 110 and/or pushed out to one or more other client devices 105. A download request indicates that one or more files or folders are to be downloaded from the file services platform 110 to the client device 105. In some implementations, the download request indicates that the one or more files or folders are to be obtained from another client device 105.

The request processing unit 205 may also receive requests to add a client device 105. In such instances, the request processing unit 205 signals the file mapping unit 210 to map the topology of files and/or folders stored on the client device 105. The file mapping unit 210 also collects metadata about these files in some implementations. In some implementations, the request processing unit 205 also signals the file transfer unit 215 to synchronize the files on the newly added client device 105 with the file datastore 220 of the file services platform 110.

The file mapping unit 210 generates a mapping of content of the client devices 105a-105d. The mapping includes topological information, such as but not limited to the directory structure of designated portions of the storage of the client devices 105a-105d, and the files stored therein. The file mapping unit 210 also collects metadata associated with the files and/or folders when mapping the topological information. The file mapping unit 210 communicates with a native application or service on the client devices 105a-105d to obtain the topological information and/or metadata from the client devices 105a-105d in some implementations. In such implementations, the file mapping unit 210 sends a request to the client devices 105a-105d as the client devices are added by the user. The file mapping unit 210 also periodically polls the client devices 105a-105d to obtain updates to the topological information and/or metadata. Furthermore, in some implementations, the native applications and/or services on the client devices 105a-105d monitor the files and/or folders on the respective client device and sends updates to the topological information and/or metadata as changes to the files and/or folders are identified. The file mapping unit 210 stores the topological information and the metadata in the file datastore 220. In some implementations, the file mapping unit 210 provides the file mapping information to each of the client devices 105a-105d. The mapping information may also be generated for files and/or folders that have been stored by the file management service 110. In implementations in which the file synchronization data is stored on the file services platform 110 and not provided to the client devices 105a-105d, the client devices 105a-105d can access and browse this information via the web application provided by the file services platform 110 and/or the browser application 255 or web-enabled native application 250 on the client devices 105a-105d.

The file transfer unit 215 is configured to facilitate the upload of files and/or folders from the client devices 105a-105d and downloads of files and/or folders to the client devices 105a-105d. The file transfer unit 215 communicates with a native application or service on the client devices 105a-105d to facilitate the uploads from the client devices 105a-105d and downloads to the client devices 105a-105d. The file transfer unit 215 stores files and/or folders in the file datastore 220 uploaded from the client devices 105a-105d. The file transfer unit 215 also facilitates the removal of files and/or folders from the client devices 105a-105d and/or the file services platform 110 in response to a request to remove a copy of the files and/or folders from the client devices 105a-105d and/or the file services platform 110. Such a request to remove the files and/or folders may be used to ensure that a copy of file remains on at least one client device 105 of the user, which the user may specify. A technical benefit of this approach is that it provides the user with fine-grained control over where copies of the files and/or folders are maintained. The topological mapping generated by the file mapping unit 210 and the metadata associated with the files and/or folders is still available to the user via any of their authorized client devices 105a-105d and/or via a user interface provided by the user interface unit 230 of the file services platform.

The user interface unit 230 provides a web application that can be accessed by a browser application or browser-enabled native application the client devices 105a-105d. The web application provides a user interface for accessing the topological information and/or metadata collected by the file mapping unit 210 to permit a user to view which files are located on each client device 105a-105d and/or the file services platform 110. The user interface includes controls the enable the user to determine which files and/or folders are synchronized from each of the client devices 105a-105d. FIGS. 4A-4D, which are described in detail in the following examples, show examples of such a user interface. In some implementations, a native application 250 on the client device provides a user interface similar to that of the web application of the user interface unit 230.

The file datastore 220 is a persistent datastore that is used by the file services platform 110 to store files and/or folders synchronized from the client devices 105a-105d, topological data determined by the file mapping unit 210, and metadata associated with the files and/or folders. The data associated with each user is segregated to prevent unauthorized users from obtaining access to the content of another user.

The authentication unit 225 provides functionality for verifying whether users are permitted to access the services provided by the file services platform 110. In some implementations, the authentication unit 225 provides functionality for receiving authentication credentials for the users from their respective client device 105 and/or from the application service 125. The authentication unit 225 may be configured to verify that the authentication credentials are valid and permit the users to access the services provided by the file services platform 110 responsive to the authentication credentials being valid.

The application service 125 may include an application services unit 260 and/or an authentication unit 265. The application services unit 260 provides functionality for users to consume, create, share, collaborate on, and/or modify various types of electronic content. The application services unit 260 may utilize the file services platform 110 to store electronic content in files and/or to access existing electronic content stored in files on the file services platform 110 and/or the client devise 105a-105d. The files may also be organized into folders, and a folder may also include a mix of files and other folders. In some implementations, the application services unit 260 provides a web-based interface to enable users to access at least a portion of the services provided by the application service 125. In other implementations, users may access the services provided by the application service 125 via one or more native applications 250. The application services unit 260 may in turn obtain the services provided by the file services platform 110.

The authentication unit 265 provides functionality for verifying whether users are permitted to access the services and/or documents provided by the application service 125 and/or the file services platform 110. In some implementations, the authentication unit 265 provides functionality for receiving authentication credentials for the users from their respective client device 105. In such implementations, the authentication unit 265 verifies that the authentication credentials are valid and permit the users to access the services and/or documents provided by the application service 125 and/or the file services platform 110 responsive to the authentication credentials being valid.

The client device 105 may include one or more native applications 250 and/or a browser application 255. In some implementations, the one or more native applications 250 includes a native application configured to communicate with the application service 125 to enable users to consume, create, share, collaborate on, and/or modify electronic content using the services provided by the application service 125. In some implementations, the one or more native applications 250 includes a native application configured to communicate with the file services platform 110. In such implementations, the native application provides an interface for users to upload files and/or folders to the file services platform 110. The user interface also enables the user to view the topological information and/or metadata collected from the client devices 105a-105d by the file mapping unit 210. The user interface also enables the user to request the download of files and/or folders to one on or more of the client devices 105a-105d and/or to remove copies of the files and/or folders from one or more of the client devices 105a-105d and/or the file services platform 110.

The browser application 255 is an application for accessing and viewing web-based content, which may be provided by the application service 125 and/or the file services platform 110. The application services 125 may provide a web application 290 that enables users to consume, create, share, collaborate on, and/or modify content. A user of the client device 105 may access the web application 290 via the browser application 255 and the browser application renders a user interface for interacting with the application services 125 in the browser application 255. In some implementations, the user interface unit 230 of the file services platform 110 provides a web application that enables the user to utilize the services of the file services platform 110 in a similar manner as the native application described above.

The application services 125 and/or the file services platform 110 may support both the one or more web-enabled native applications 250 and one or more web applications 290, and the users may choose which approach best suits their needs. The file services platform 110 may also provide support for the one or more native applications 250, the browser application 255, or both to provide functionality for a user of the client device 105 to obtain the services provided by the file services platform 110.

FIGS. 3A-3D show examples of interactions between the client devices 105 and the file services platform 110. In this example, the file services platform 110 obtains mapping information from the client devices 105a and 105b. As discussed in the preceding examples, the file mapping unit 210 of the file services platform 110 can obtain topological information and/or metadata from each of the client devices. In this example, the file mapping unit 210 sends a request for file mapping information 302 to the client device 105a and a request for file mapping information 306 to the client device 105b. The request for file mapping information 302 is received and processed by a native application or service on the client device 105a, and the client device 105a provides the file mapping information 304 in response to the request. The file mapping information 304 includes topological information and metadata for the files and/or folders stored on the client device 105a. Similarly, the request for file mapping information 306 is received and processed by a native application or service on the client device 105b, and the client device 105b provides the file mapping information 308 in response to the request. The file mapping information 308 includes topological information and metadata for the files and/or folders stored on the client device 105b. The process shown in FIG. 3A may be performed as client devices are added by the user. In some implementations, the user may initiate the mapping process from the respective client devices 105a and 105b by accessing the file services platform 110 from these devices and associating these devices with the user and providing authorization for the file services platform 110 to map the files and/or folders of these devices and/or to synchronize the files and/or folders of these devices with the file services platform 110 and/or with one or more of the other client devices 105. In other implementations, the user may initiate the mapping process through a user interface provided by the file services platform 110 in which the user selects the client devices 105 to be associated with the user.

Figure 3A:
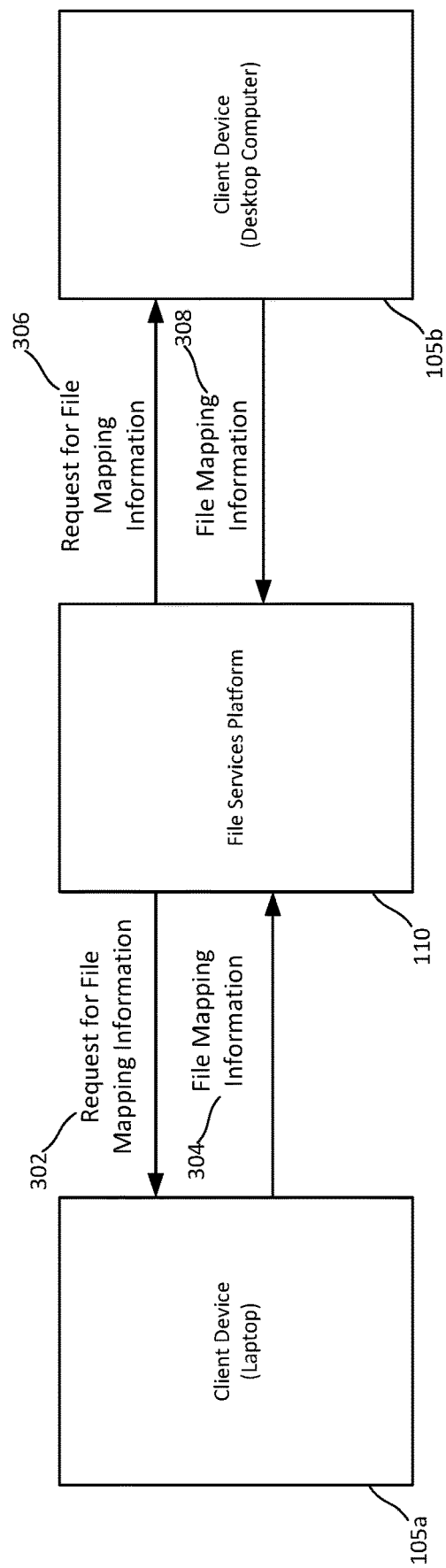
FIGS. 3A-3D show examples of interactions between the client devices and the file services platform shown in the preceding figures.
Figure 3B:
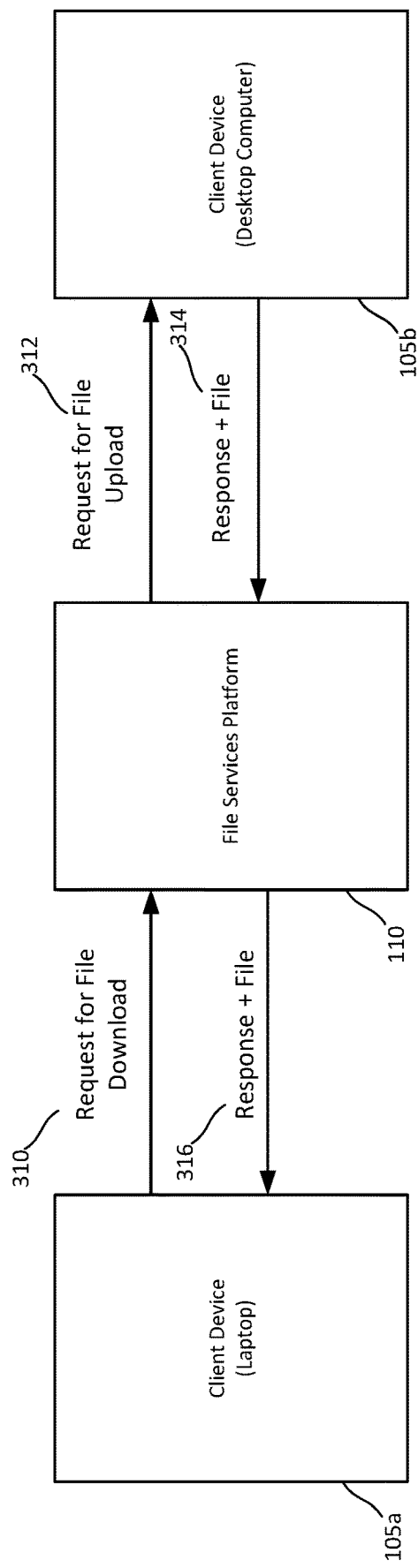

FIG. 3B is an example in which the user is currently using their laptop computer, which is the client device 105a, but requires access to a copy of a file that is stored on their desktop computer, which is the client device 105b. In this example implementation, the file that the user would like to access is not available on the file services platform 110 but is available on the desktop computer, the client device 105b. The user indicated that this file should be stored on the client device 105b but not also synchronized with the file services platform 110. The user may have elected to keep a copy of the file only on their desktop computer to ensure that copies of a sensitive document were not available on their laptop computer or other client devices 105c or 105d. However, the file services platform 110 has collected topological information and metadata from each of the client devices 105a-105d. The user can review the topological information and metadata from the user interface of the native application 290 on the laptop computer or the user interface provided by the web application of the user interface unit 230 of the file services platform 110. The user can select the file on the desktop computer that they would like to download to the laptop computer, and the file services platform 110 coordinates the upload of the file from the desktop computer and the download of the file to the laptop computer.

The client device 105a sends a request for file download 310 to the file services platform 110. The file transfer unit 215 of the file services platform 110 determines that the file is not available in the file datastore 220 of the file services platform 110 because the file has not been synchronized with the file services platform 110 and requests the file from the client device 105b. The file services platform 110 sends a request for file upload 312 to the client device 105b. The native application or service associated with the file services platform 110 and running on the client device 105b receives the request for file upload 312. The native application or service returns a response message 314 and the requested file to the file services platform 110. The file transfer unit 215 then sends a response 316 and the requested file to the client device 105a. In some implementations, the client device 105b uploads the requested file to the file services platform 110 but does not include the response 314, which may include status information, updated metadata, and/or other information associated with the requested file or with the request 312. Similarly, in some implementations, the file services platform 110 may download the requested file to the client device 105b without including the response 316. The response 316 may include status information, updated metadata, and/or other information associated with the requested file or with the request 310.

In some implementations, the client device 105b may be temporarily powered down or otherwise unavailable, in such instances, the file transfer unit 215 is configured to periodically resend a request for file download 310 to the file services platform 110. In other implementations, the file services platform 110 may maintain a queue of requests and/or other notifications for client devices 105 that are powered down or otherwise unavailable, and the client devices 105 send a request to the file services platform 110 upon powering up, rebooting, or otherwise becoming available once again to check for requests and/or notifications from the file services platform 110.

Figure 3C:
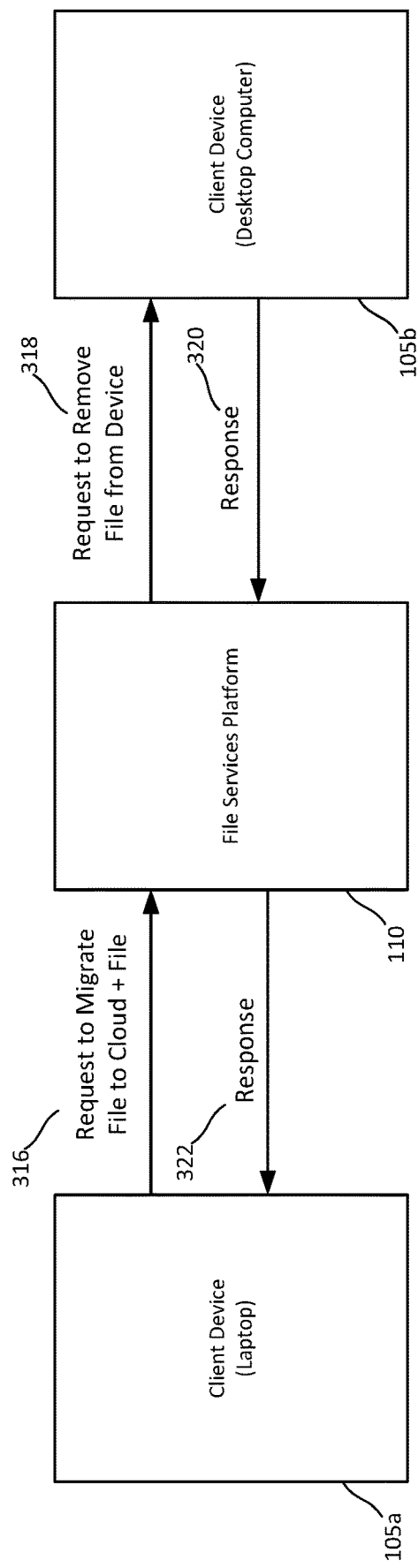

FIG. 3C is an example in which a user sends a request to migrate a file from one or more client devices 105a and 105b to the file services platform 110 and to remove the local copies of the files from the client devices 105a and 105b. In such an implementation, the user may wish to migrate local copies of a file from one or more client devices 105a and 105b to the file services platform 105 for storage. The user may wish to perform such an action where the client devices 105a and 105b to free up storage space on the client devices 105a and 105b. Furthermore, the client devices 105a and 105b may be accessible to other users, and the user prefers to remove local copies of the file from these devices.

In the example shown in FIG. 3C, a local copy of the file is found on both the client device 105a and 105b. The user selects the file to be migrated and initiates a command in the native application 250 or browser application 255 on the client device 105a. The native application 250 or browser application 255 sends a request to migrate the file 316 and the file to the file services platform 110. In this implementation, the file has not been synchronized with the file services platform 110. However, if the file had already been synchronized with the file services platform 110, the client device 105a would not need to upload a copy of the file to the file services platform 110 with the request 316. The file transfer unit 215 of the file services platform 110 stores a copy of the file in the file datastore 220 if the file had not already been stored therein. The file transfer unit 215 also determines that another local copy of the file is present on the client device 105b (the user's desktop computer) based on the topological information and/or metadata collected by the file mapping unit 210 and stored in the file datastore 220. The file transfer unit 215 sends a request 318 to remove the file from the client device 105b. The native application or service associated with the file services platform 110 operating on the client device 105b receives the request, deletes the local copy of the file, and provides a response 320 confirming that the local copy of the file has been removed. In some implementations, the client devices 105b was the only device having a local copy of the file, and the client device 105b send a copy of the file with the response 320. In such implementations, the file services platform 110 sends an acknowledgement that the file has been received with the response 320 before the client device 105b deletes the local copy of the file from that device. In some implementations, the file services platform 110 may send a response 322 to the client device 105a indicating that the request to migrate the file to the cloud-based storage of the file services platform 110 has been completed.

Figure 3D:
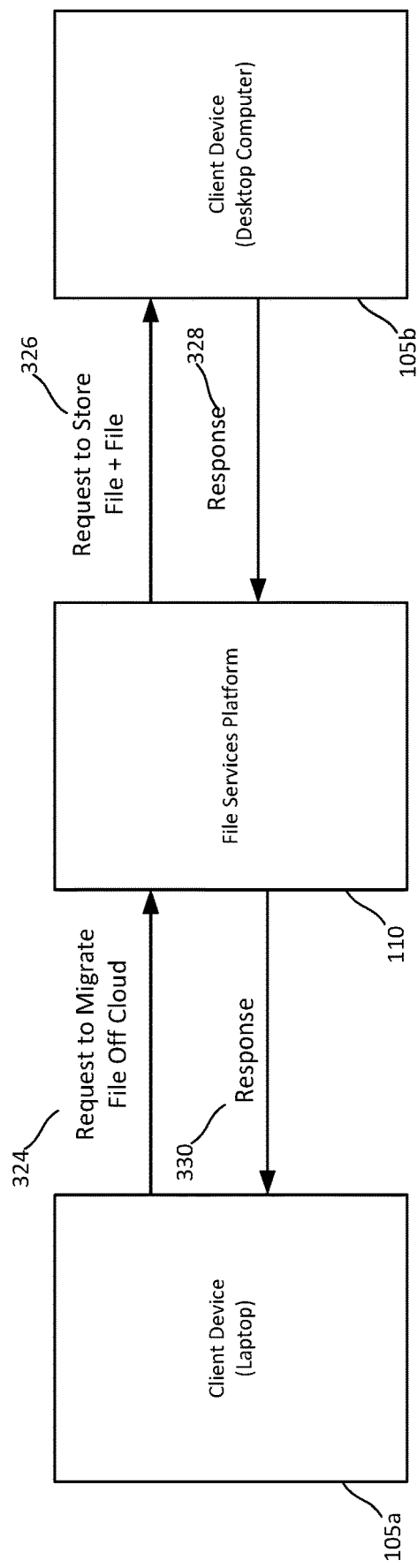

FIG. 3D is an example in which a user requests that a file be removed from the file services platform 110 and be stored locally on their desktop computer, the client device 105b. The user in this instance prefers to store a single copy of the file on the desktop computer 105*b* and to remove the copy of the file synchronized and stored by the file services platform 110. The user selects the file to be migrated to the client device 105*b* and initiates a command in the native application 250 or browser application 255 on the client device 105*a*. The native application 250 or browser application 255 sends a request to migrate the file 324 off the file services platform 110. The request indicates that the file should be removed from the file datastore 220 and a copy of the file migrated to the client device 105*b*. The file transfer unit 215 of the file services platform 110 sends a request 326 to store the file on the client device 105*b*. A copy of the file is provided with the request 326 instances where the file is not currently stored on the client device 105*b*, or the latest version of the file had not yet been synchronized with the client device 105*b*. The native application or service on the client device 105*b* sends a response 328 to the file services platform 110 indicating that the file has been stored by the client device 105*b*. The file services platform 110 may then remove any local copies of the file from the file datastore 220. The file services platform 110 may also send a response 330 to the client device 105*a* indicating that the request 324 has been completed.

Figure 4A:
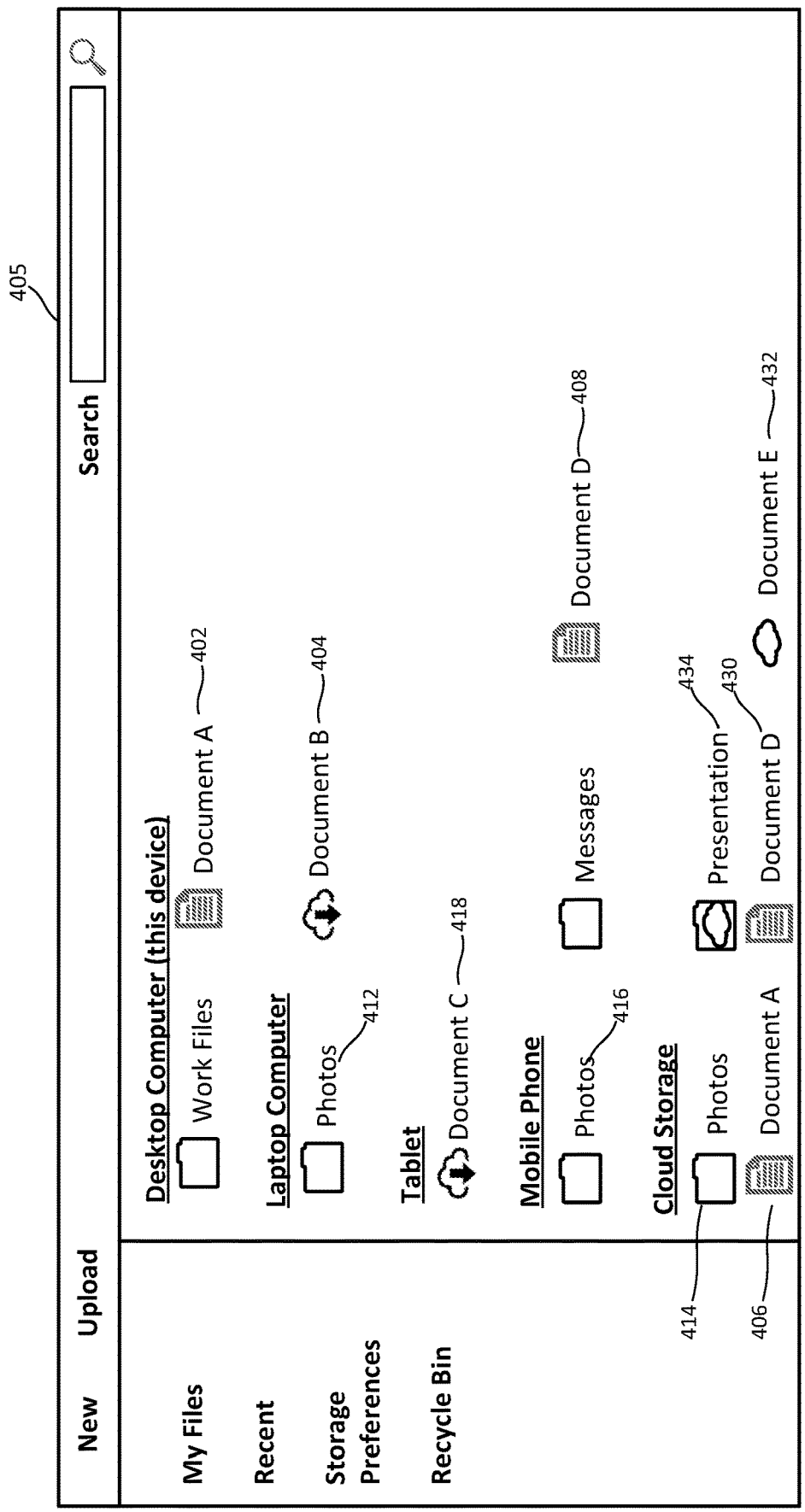
FIGS. 4A-4D are diagrams of an example user interface for managing the storage and download of files among the client devices and the file services platform shown in the preceding figures.

FIGS. 4A-4D are diagrams of an example user interface 405 for managing the storage and download of files among the client devices 105*a*-105*d* and the file services platform 110. FIG. 4A provides a view of the files and/or folders that are available on each of the client devices 105*a*-105*d* and the file services platform 110 for a particular user. The view provided by the user interface 405 is based on the topological information and/or metadata collected from each of the client devices and/or the file services platform 110 by the file mapping unit 210. Because this mapping information is synchronized with the file services platform 110 and/or the client devices 105*a*-105*d* as updates are made to files or folders stored therein, a first client device 105 may browse and interact with the topological information and/or metadata from each of the other client devices 105, even if one of the other client devices 105 is temporarily unavailable. For example, the client device 105*a* (the laptop computer) may temporarily lose network connectivity as the user packs the device up and takes it with them. Upon regaining network connectivity, the client device 105*a* contacts the file services platform 110 to determine whether the file services platform 110 has any notifications pending in the notifications queue for the client device 105*a* and performs any actions associated with those notifications. The actions may include updating mapping data, performing one or more actions related to one or more files or folders, including synchronizing of files and/or folders among the client devices 105*a*-105*d* and the file services platform 110. Consequently, the client devices 105*a*-105*d* and the file services platform 110 can operate asynchronously for a period of time while a client device is unavailable.

The view shown by the user interface 405 includes icons that represent the various states of the content items. A folder icon indicates that a folder is backed up on a particular device or on the cloud storage provided by the file services platform 110. In this example, the photos folders 412, 414, and 416 are synchronized with the mobile phone, cloud storage, ad the laptop computer, respectively. A folder icon with a cloud indicates that the folder is backed up only on the cloud storage. In this example, the presentation folder 434 is stored solely on the cloud storage and has not been synchronized with any of the client devices 105*a*-105*d*. A file icon indicates that an instance of the file is synchronized to a particular device. In this example, the document A is synchronized on the desktop computer as document 402 and the cloud storage as document 406, and the document D is synchronized on the mobile phone as document 408 and the cloud storage as document 430. A cloud-icon indicates that a file is backed up solely on the cloud storage and has not been synchronized with any of the client device 105*a*-105*b*. A file icon with a downward pointing arrow indicates an instance of a file that is available on a remote device but can be downloaded to the current device (the desktop computer in this example), to another client device and/or to upload to the cloud storage. In this example, the document B 404 stored on the laptop computer is the only instance of this file stored on the client devices 105*a*-105*d* and the cloud storage provided by the file services platform 110. Likewise, the document C 418 stored on the table is the only instance of this file stored on the client devices 105*a*-105*d* and the cloud storage provided by the file services platform 110. A cloud icon next to a document, such as the document E 432, indicates that the document is stored only on the cloud storage and has not been synchronized with any of the client devices 105*a*-105*d*.

The user may click on or otherwise interact with these icons to cause the cause the file services platform 110 to perform various actions on these files, such as but not limited to download an instance of the file to a current device, download move a file from one client device 105 to another client device 105 or the file services platform 110. Other actions may include moving a file from file services platform 110 to one or more client devices 105 and removing the instance of the file from the file services platform 110. Other such actions are also available in other implementations.

Figure 4B:
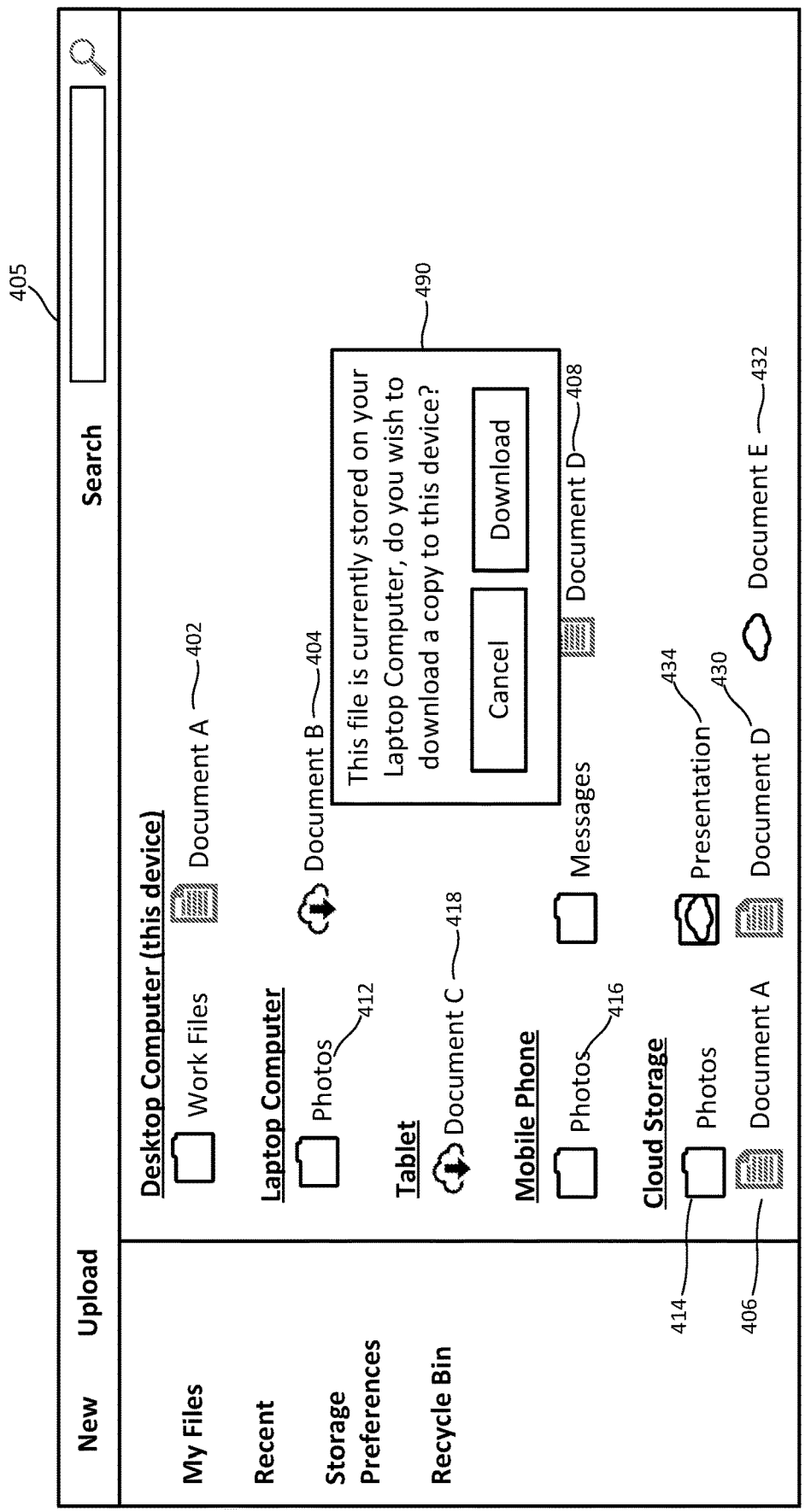
Figure 4C:
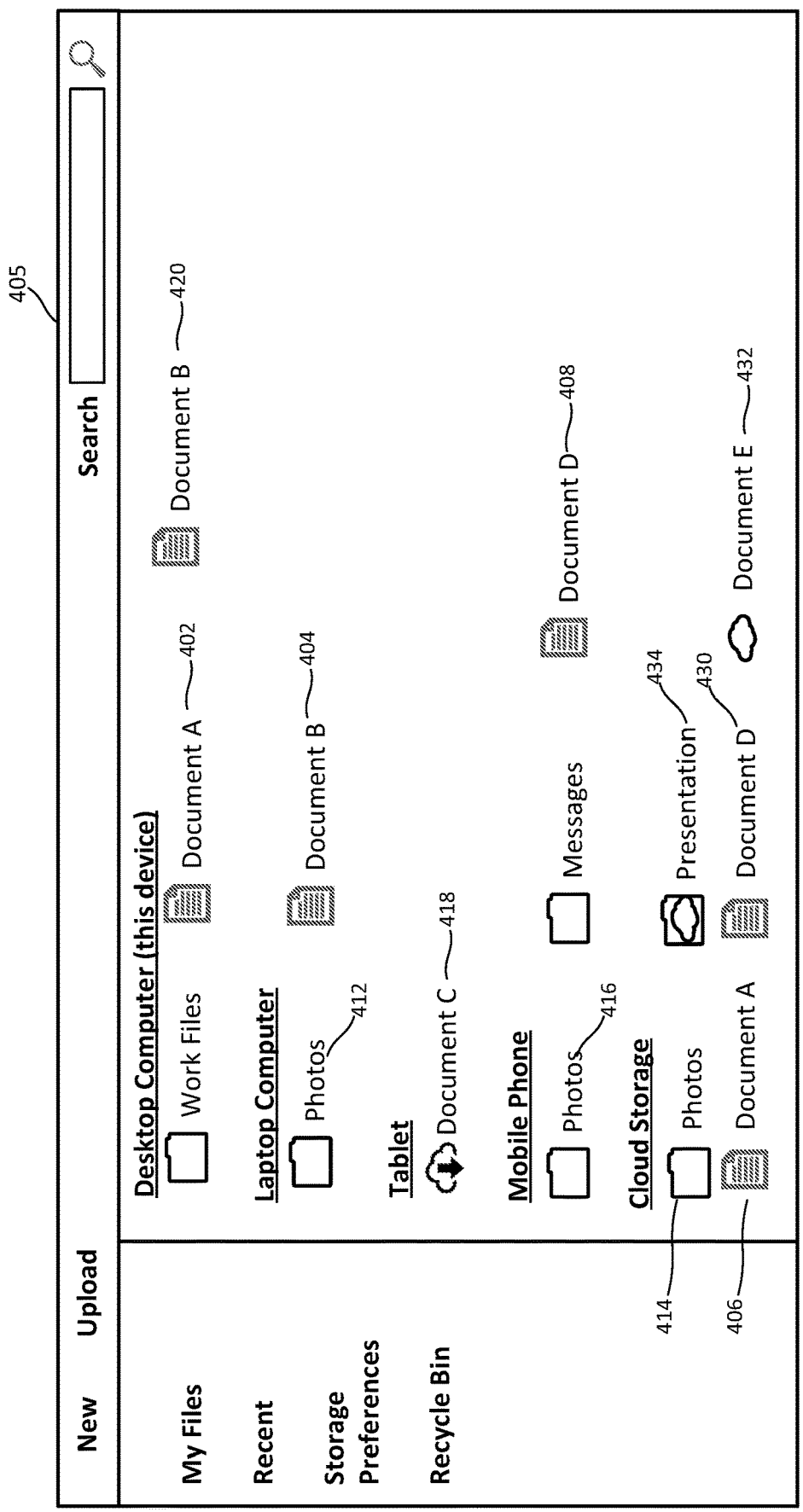

FIG. 4B is an example in which the user has clicked on or otherwise activated the icon associated with document B 404 stored on the laptop computer. In this example, the user is accessing the user interface 405 from the desktop computer which does not include a copy of the document B 404. In response to the user activating the icon, the user is presented with the prompt 490, which asks the user whether they would like to download a copy of the file to the desktop computer. The user may cancel the request or may confirm that they wish to proceed with the download. FIG. 4C shows an updated version of the user interface 405 in which an instance of the document B 420 has been downloaded to the desktop computer. Furthermore, the icon associated with the document B 404 has also been updated to a document icon, indicating that there are now multiple synchronized copies of the file available. In this example, the document B is synchronized to both the desktop computer and the laptop computer. Changes to the instance of document B 420 on the desktop computer will be synchronized with the instance of the document B 404 on the laptop computer, and vice versa.

Figure 4D:
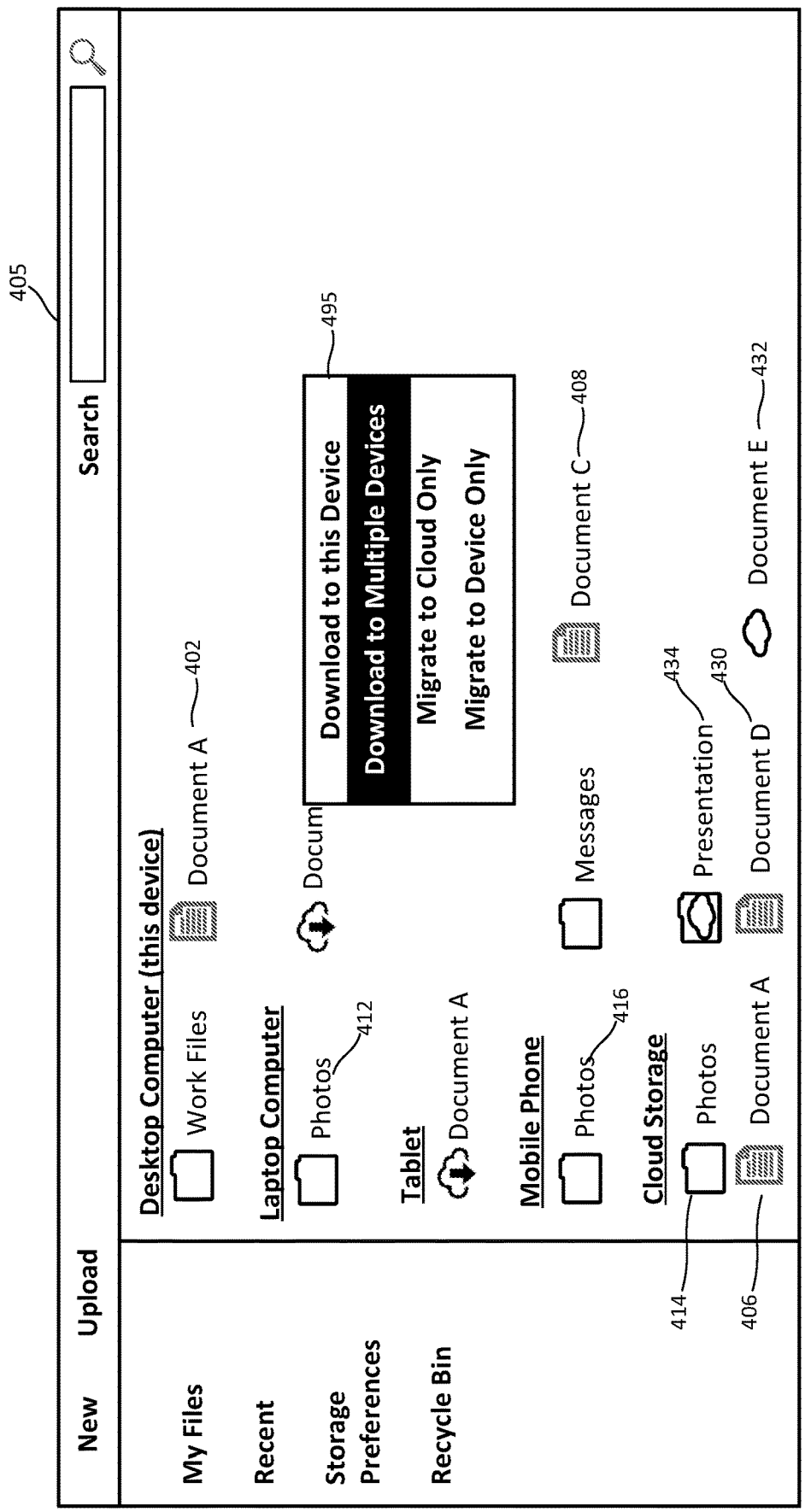

FIG. 4D shows an example of a menu 495 that may be activated by right-clicking or otherwise interacting with an icon on the user interface 405. The menu 495 includes options to trigger the download of a selected file or folder to the current device, to trigger the download of the file or folder to multiple devices, to migrate the file or folder to the cloud-based storage on the file services platform 110 only, or to migrate the file or folder to off of cloud-based storage on the file services platform 110 to on or more client devices. Downloading a file or folder to the current client device permits the user to temporarily or to permanently store a local copy of the file or folder on the client device 105. The user may choose to later migrate the copy of the file or folder from the client device 105 to the cloud or another client device 105. The option to migrate the file or folder to the cloud only causes the file services platform 110 to store a copy of the file in the file datastore 220 and to send requests to each of the client devices 105a-105d that have local copies of the file or folder to synchronize their copies with that of the file services platform 110 and to remove the local copies. The option to migrate the file or folder to device only storage permits the user to designate one or more of the client devices 105a-105d to store an instance of the file or folder and to remove any instances of the file or folder stored on other client devise and/or the cloud-based storage provided by the file services platform 110. In instances where multiple copies of the file are maintained on multiple client devices, the file services platform 110 may still facilitate synchronizing these files among the client devices on which the file is stored.

Figure 5:
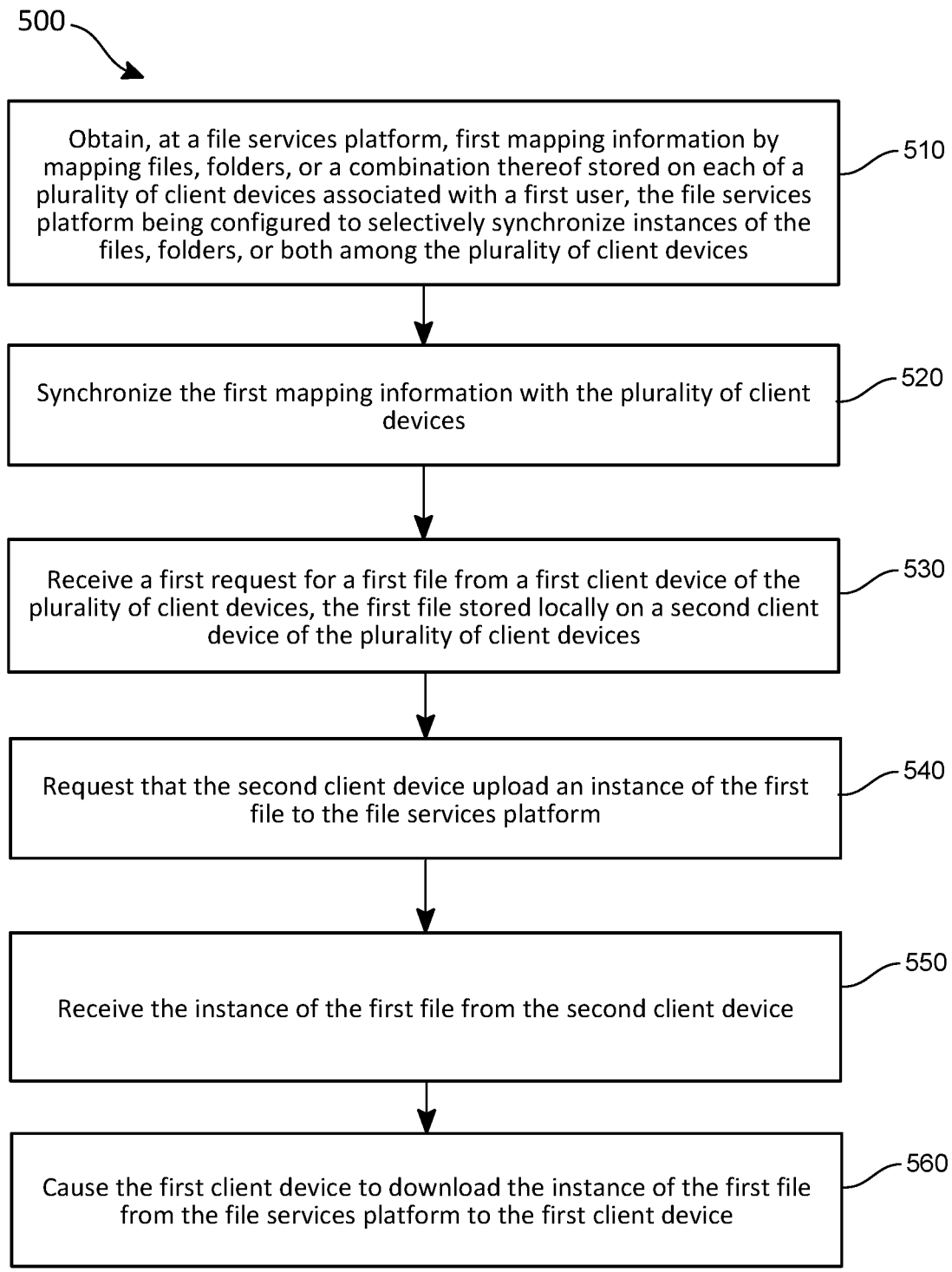
FIG. 5 is an example flow chart of an example process for managing synchronization of file among a plurality of client devices and a file services platform.

FIG. 5 is an example flow chart of an example process 500 for managing synchronization of file among a plurality of client devices and a file services platform. The process 500 may be implemented by the file services platform 110 described in the preceding examples.

The process 500 includes an operation 510 of obtaining, at a file services platform, first mapping information by mapping files, folders, or a combination thereof stored on each of a plurality of client devices associated with a first user, the file services platform being configured to selectively synchronize instances of the files, folders, or both among the plurality of client devices.

The process 500 includes an operation 520 of synchronizing the first mapping information with the plurality of client devices. As discussed in the preceding examples, the file services platform 110 provides the mapping information to each of the client devices 105 associated with the user that are authorized receive the mapping information.

The process 500 includes an operation 530 of receiving a first request for a first file from a first client device of the plurality of client devices, the first file stored locally on a second client device of the plurality of client devices. The user would like to access a file that is stored on a different client device. This file is stored local on this other client device and is not synchronized with the file services platform 110. However, the techniques provided herein enable the user to browse what is stored on the other client device and/or the file services platform 110 by synchronizing the mapping information among the devices.

The process 500 includes an operation 540 of requesting that the second client device upload an instance of the first file to the file services platform and an operation 550 of receiving the instance of the first file from the second client device. The file services platform 110 facilitates obtain the instance of the first file from the second client device.

The process 500 includes an operation 560 of causing the first device to download the instance of the first file from the file services platform to the first client device. In some implementations, the file services platform 110 sends a notification to the first client device that the requested file is ready for download and the first client device initiates the download of the first file. In other implementations, the file services platform 110 pushes the instance of the first file to the first client device 105 in once the instance of the first file has been obtained from the second client device.

Figure 6:
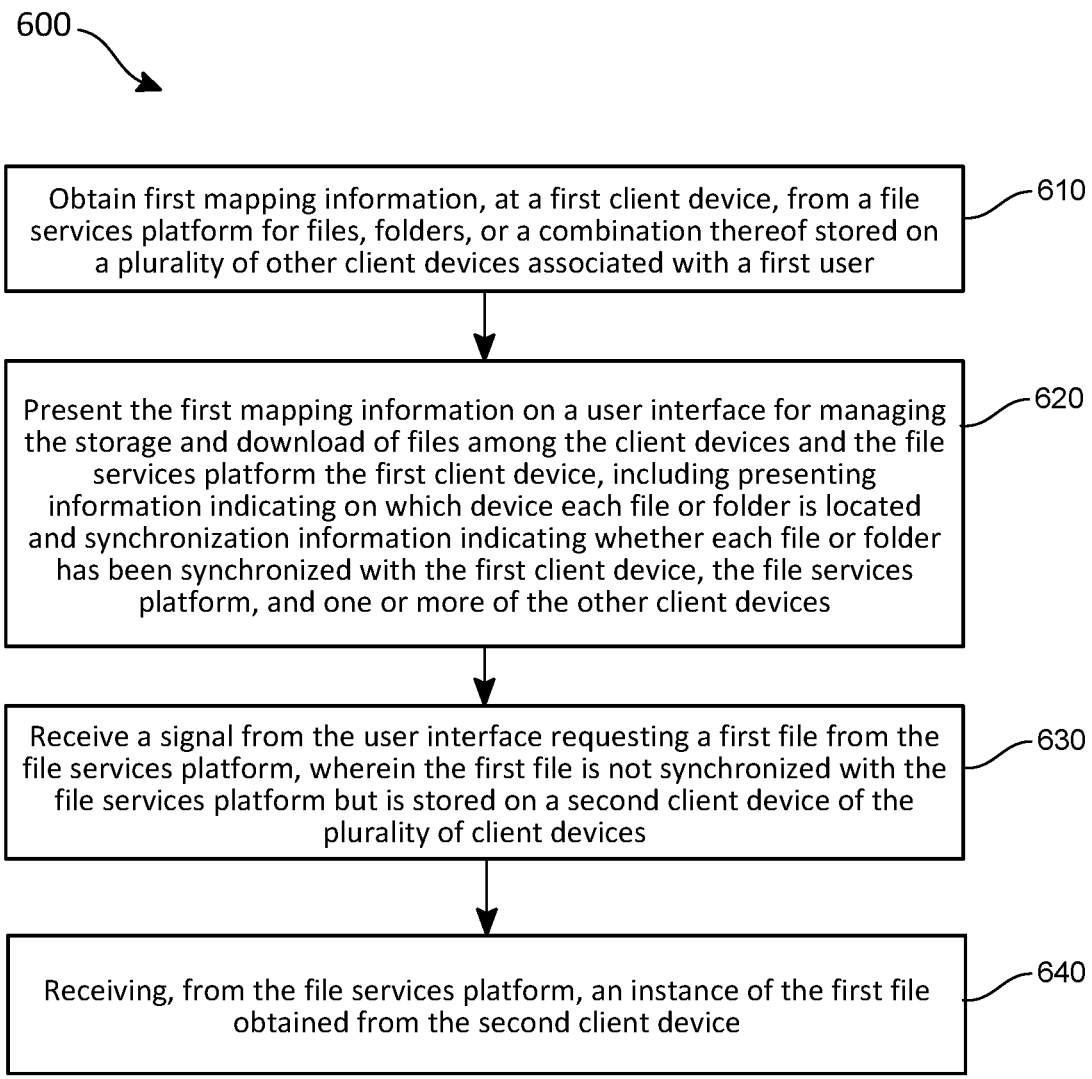
FIG. 6 is an example flow chart of another example process for managing synchronization of file among a plurality of client devices and a file services platform.

FIG. 6 is an example flow chart of an example process 600 for managing synchronization of file among a plurality of client devices and a file services platform. The process 600 may be implemented by a native application or service on the client device 105.

The process 600 includes an operation 610 of obtaining first mapping information, at a first client device, from a file services platform for files, folders, or a combination thereof stored on a plurality of other client devices associated with a first user. As discussed in the preceding examples, the native application or service on the client devices 105 can obtain topological and metadata information from each of the client devices 105 associated with a user. The file services platform 110 facilitates synchronizing this information with each of the client devices 105. A technical benefit of this approach is that the files and/or folders stored on the client devices do not need to be synchronized as well. Consequently, the amount of network, computing, and memory resources of the client devices 105 and the file services platform 110 are significantly reduces. Furthermore, the user can selectively determine which files and/or folders are synchronized with the file services platform 110 and each of the client devices 105. This approach provides improved security for sensitive files by reducing the chances that a sensitive file could be access by an unauthorized user who obtains access to one of the user's client devices 105.

The process 600 includes an operation 610 of presenting the first mapping information on a user interface for managing the storage and download of files among the client devices and the file services platform the first client device, including presenting information indicating on which device each file or folder is located and synchronization information indicating whether each file or folder has been synchronized with the first client device, the file services platform, and one or more of the other client devices. An example of this user interface is shown in FIGS. 4A-4D.

The process 600 includes an operation 610 of receiving a signal from the user interface requesting a first file from the file services platform. The first file is not synchronized with the file services platform but is stored on a second client device of the plurality of client devices associated with the user. However, the user can browse the mapping information obtained from the plurality of client devices associated with the user using the interface 405 shown in the preceding examples. The user determines that an instance of the first file is stored on the second client device 105 and initiates a request to the file services platform 110 to obtain an instance of the file from the second client device 105 and to provide the instance of the file to the first client device.

The process 600 includes an operation 610 of receiving, from the file services platform, an instance of the first file obtained from the second client device. The client device 105 may store the instance of the first file in a memory of the first client device in a memory that is mapped and synchronized among the plurality of client devices 105 associated with the user and the file services platform 110.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
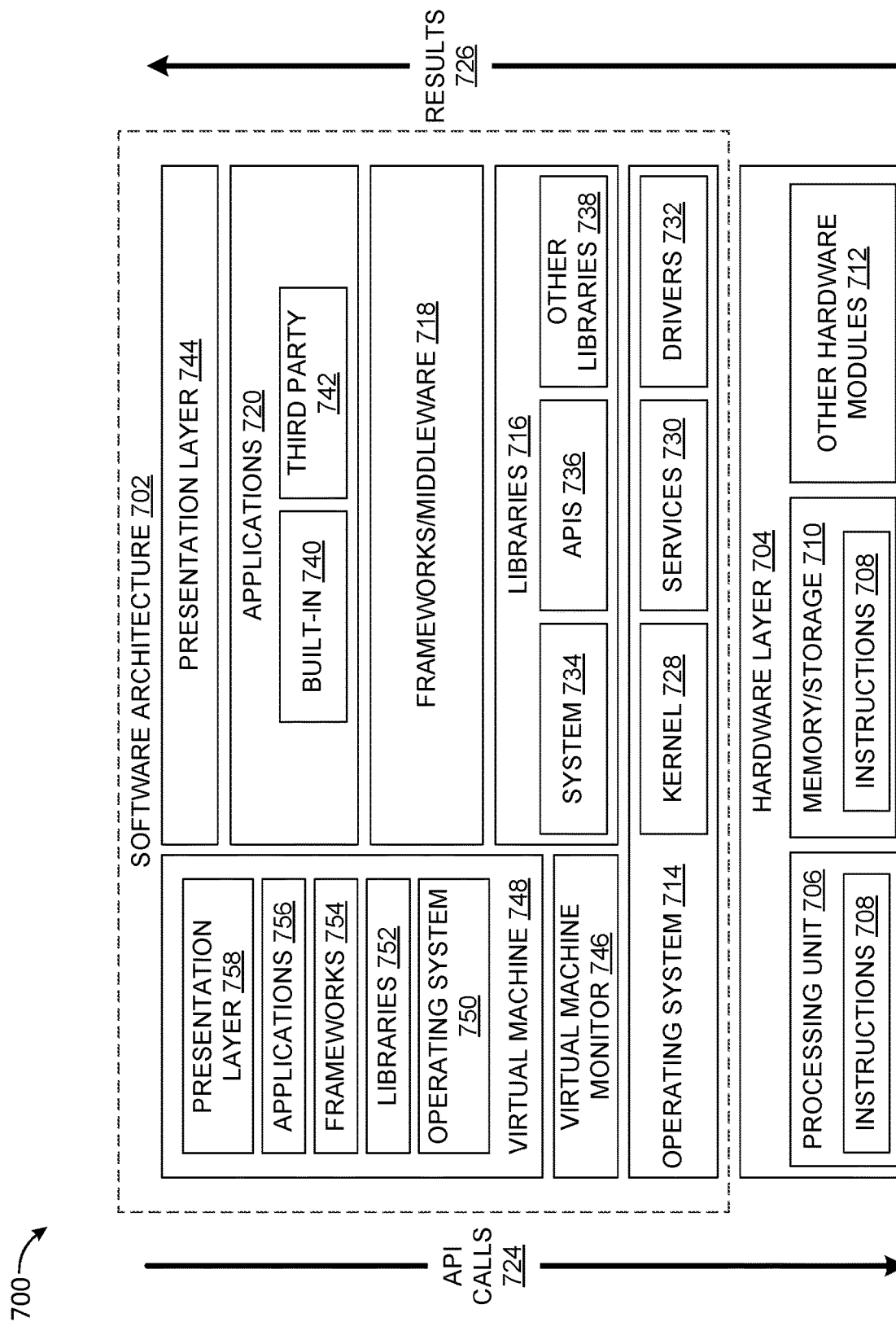
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
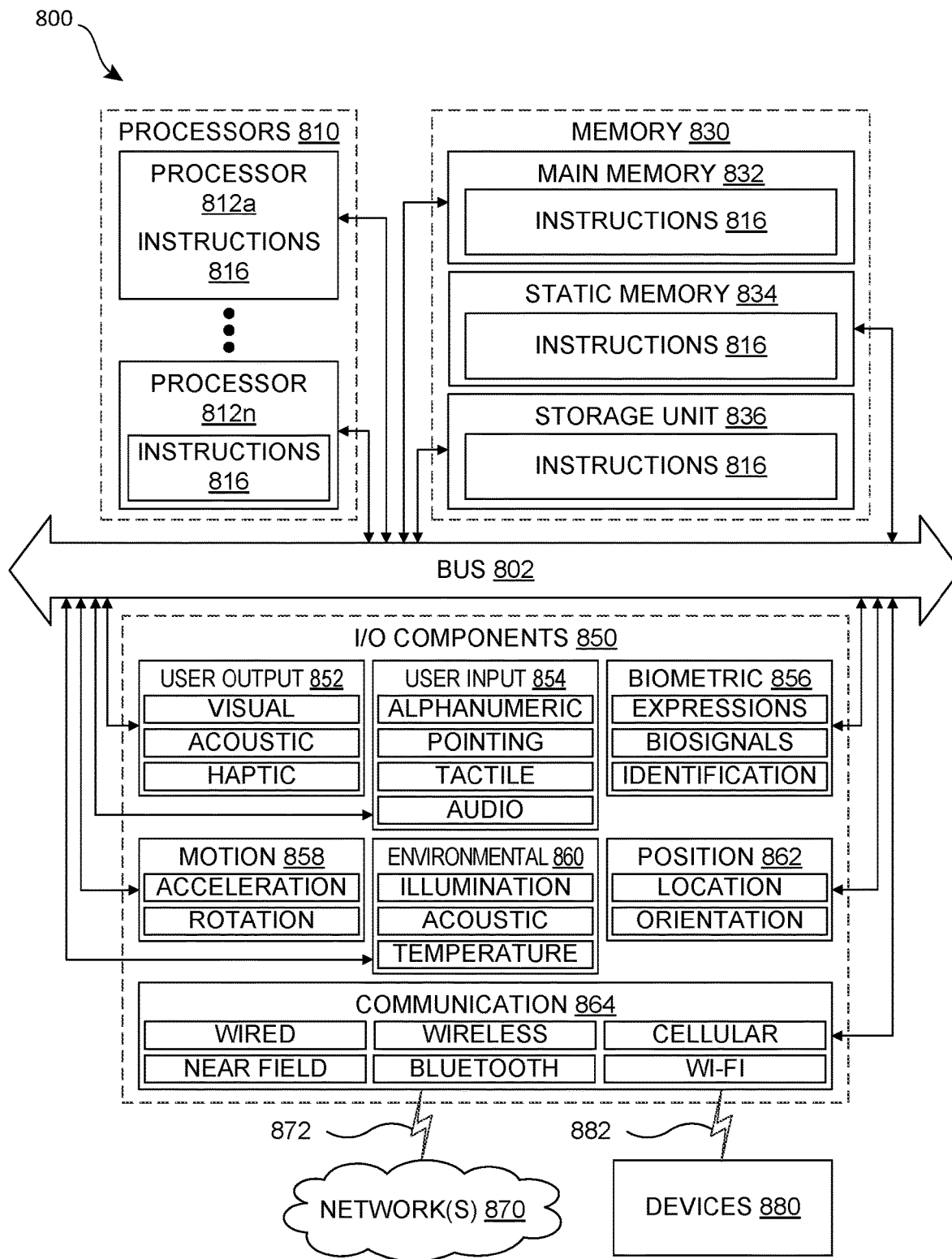
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable storage medium storing executable instructions that, when executed, cause the processor to perform operations comprising:
      obtaining, at a file services platform, first mapping information by mapping files, folders, or a combination thereof stored on each of a plurality of client devices associated with a first user, the file services platform being configured to selectively synchronize instances of the files, folders, or both among the plurality of client devices;
      synchronizing the first mapping information with the plurality of client devices;
      receiving a first request for a first file from a first client device of the plurality of client devices, the first file stored locally on a second client device of the plurality of client devices;
      requesting that the second client device upload an instance of the first file to the file services platform;
      determining that the file services platform is unable to establish a connection with the second client device;
      generating a first notification message for the second client device requesting that the second client device upload the instance of the first file to the file services platform;
      placing the first notification message in a queue on the file services platform;
      receiving a signal from the second client device requesting notifications for the second client device from the queue;
      sending the notifications for the second client device, including the first notification, to the second client device;
      receiving the instance of the first file from the second client device in response to sending the first notification; and
      causing the first client device to download the instance of the first file from the file services platform to the first client device.

2. The data processing system of claim 1, wherein the first mapping information includes topological information and metadata for each of the plurality of client devices, the topological information including information how the files, folders, or both are organized on a respective client device of the plurality of client devices, and the metadata representing attributes of the files, folders, or both.

3. The data processing system of claim 1, wherein the machine-readable storage medium includes instructions configured to cause the processor to perform operations of:
   sending a notification to the first client device that the second client device is currently unavailable and the first file will be obtained once the second client device is once again available.

4. A data processing system comprising:
   a processor; and
   a machine-readable storage medium storing executable instructions that, when executed, cause the processor to perform operations comprising:
      obtaining, at a file services platform, first mapping information by mapping files, folders, or a combination thereof stored on each of a plurality of client devices associated with a first user, the file services platform being configured to selectively synchronize instances of the files, folders, or both among the plurality of client devices;
      synchronizing the first mapping information with the plurality of client devices;
      receiving a first request for a first file from a first client device of the plurality of client devices, the first file stored locally on a second client device of the plurality of client devices;
      requesting that the second client device upload an instance of the first file to the file services platform;
      receiving the instance of the first file from the second client device;
      causing the first client device to download the instance of the first file from the file services platform to the first client device;
      receiving a second request from the first client device to migrate a second file from the second client device to a storage of the file services platform;
      requesting that the second client device upload an instance of the second file to the file services platform;
      receiving the instance of the second file from the second client device;
      storing the instance of the second file in a datastore of the file services platform; and sending an acknowledgement to the second client device that the second file has been successfully received and to delete the second file from the second client device.

5. The data processing system of claim 4, wherein the machine-readable storage medium includes instructions configured to cause the processor to perform operations of:
updating the first mapping information for the second client device and the file services platform to generate updated mapping information; and
synchronizing the updated mapping information with the plurality of client devices.

6. A data processing system comprising:
a processor; and
a machine-readable storage medium storing executable instructions that, when executed, cause the processor to perform operations comprising:
obtaining, at a file services platform, first mapping information by mapping files, folders, or a combination thereof stored on each of a plurality of client devices associated with a first user, the file services platform being configured to selectively synchronize instances of the files, folders, or both among the plurality of client devices;
synchronizing the first mapping information with the plurality of client devices;
receiving a first request for a first file from a first client device of the plurality of client devices, the first file stored locally on a second client device of the plurality of client devices;
requesting that the second client device upload an instance of the first file to the file services platform;
receiving the instance of the first file from the second client device;
causing the first client device to download the instance of the first file from the file services platform to the first client device;
receiving a second request from the first client device to migrate a second file from the file services platform to the second client device;
sending a third request to store the second file and the second file to the second client device;
receiving an acknowledgement from the second client device in response to the third request, the acknowledgement indicating that the second file has been receiving and stored by the second client device; and
removing the second file from a datastore of the file services platform responsive to receiving the acknowledgment.

7. The data processing system of claim 6, wherein the machine-readable storage medium includes instructions configured to cause the processor to perform operations of:
updating the first mapping information for the second client device and the file services platform to generate updated mapping information; and
synchronizing the updated mapping information with the plurality of client devices.

8. A data processing system comprising:
a processor; and
a machine-readable storage medium storing executable instructions that, when executed, cause the processor to perform operations comprising:
obtaining first mapping information, at a first client device, from a file services platform for files, folders, or a combination thereof stored on a plurality of other client devices associated with a first user;
presenting the first mapping information on a user interface for managing the storage and download of files among the client devices and the file services platform the first client device, including presenting information indicating on which device each file or folder is located and synchronization information indicating whether each file or folder has been synchronized with the first client device, the file services platform, and one or more of the other client devices;
receiving a signal from the user interface requesting a first file from the file services platform, wherein the first file is not synchronized with the file services platform but is stored on a second client device of the plurality of client devices; and
receiving, from the file services platform, an instance of the first file obtained from the second client device.

9. The data processing system of claim 8, wherein the first mapping information includes topological information and metadata for each of the plurality of client devices, the topological information including information how the files, folders, or both are organized on a respective client device of the plurality of client devices, and the metadata representing attributes of the files, folders, or both.

10. The data processing system of claim 8, wherein requesting that the second client device upload the instance of the first file to the file services platform further comprises:
detecting that changes have been made to a file, folder, or both on the first client device; and
sending updates to the first mapping information to the file services platform in response to detecting the changes.

11. The data processing system of claim 8, wherein requesting that the second client device upload the instance of the first file to the file services platform further comprises:
sending a request from the first client device to the file services platform to migrate a second file from the second client device to a storage of the file services platform;
receiving an acknowledgement from the file services platform that the second file has been migrated to the file services platform from the second client device.

12. The data processing system of claim 8, wherein requesting that the second client device upload the instance of the first file to the file services platform further comprises:
sending a request from the first client device to the file services platform to migrate a second file from the file services platform to the second client device; and
receiving an acknowledgement from the file services platform that the second file has been migrated to the file services platform from the second client device.

13. The data processing system of claim 8, wherein requesting that the second client device upload the instance of the first file to the file services platform further comprises:
storing the instance of the first file in a datastore of the first client device.

14. A method implemented in a data processing system for managing synchronization of files among a plurality of client devices and a file services platform, the method comprising:
obtaining, at a file services platform, first mapping information by mapping files, folders, or a combination thereof stored on each of a plurality of client devices associated with a first user, the file services platform being configured to selectively synchronize instances of the files, folders, or both among the plurality of client devices;

synchronizing the first mapping information with the plurality of client devices;

receiving a first request for a first file from a first client device of the plurality of client devices, the first file stored locally on a second client device of the plurality of client devices;

requesting that the second client device upload an instance of the first file to the file services platform;

determining that the file services platform is unable to establish a connection with the second client device;

generating a first notification message for the second client device requesting that the second client device upload the instance of the first file to the file services platform;

placing the first notification message in a queue on the file services platform;

receiving a signal from the second client device requesting notifications for the second client device from the queue;

sending the notifications for the second client device, including the first notification, to the second client device;

receiving the instance of the first file from the second client device in response to sending the first notification; and causing the first client device to download the instance of the first file from the file services platform to the first client device.

15. The method of claim 14, wherein the first mapping information includes topological information and metadata, the topological information including information how the files, folders, or both are organized on a respective client device, and the metadata representing attributes of the files, folders, or both.

16. The method of claim 14, further comprising:

sending a notification to the first client device that the second client device is currently unavailable and the first file will be obtained once the second client device is once again available.

17. A method implemented in a data processing system for managing synchronization of files among a plurality of client devices and a file services platform, the method comprising:

obtaining, at a file services platform, first mapping information by mapping files, folders, or a combination thereof stored on each of a plurality of client devices associated with a first user, the file services platform being configured to selectively synchronize instances of the files, folders, or both among the plurality of client devices;

synchronizing the first mapping information with the plurality of client devices;

receiving a first request for a first file from a first client device of the plurality of client devices, the first file stored locally on a second client device of the plurality of client devices;

requesting that the second client device upload an instance of the first file to the file services platform;

receiving the instance of the first file from the second client device; and causing the first client device to download the instance of the first file from the file services platform to the first client device;

receiving a second request from the first client device to migrate a second file from the second client device to a storage of the file services platform;

requesting that the second client device upload an instance of the second file to the file services platform;

receiving the instance of the second file from the second client device;

storing the instance of the second file in a datastore of the file services platform; and sending an acknowledgement to the second client device that the second file has been successfully received and to delete the second file from the second client device.

18. The method of claim 17, further comprising:

updating the first mapping information for the second client device and the file services platform to generate updated mapping information; and synchronizing the updated mapping information with the plurality of client devices.

* * * * *